(No Model.)

B. F. MOSS.
CROSSCUT SAW.

No. 508,484. Patented Nov. 14, 1893.

WITNESSES:
F. W. Warner
J. A. Walsh

INVENTOR
Benjamin F. Moss,
BY
Chester Bradford,
ATTORNEY.

THE NATIONAL LITHOGRAPHING COMPANY,
WASHINGTON, D. C.

UNITED STATES PATENT OFFICE.

BENJAMIN FRANKLIN MOSS, OF READING, MICHIGAN, ASSIGNOR TO ELIAS C. ATKINS, OF INDIANAPOLIS, INDIANA.

CROSSCUT-SAW.

SPECIFICATION forming part of Letters Patent No. 508,484, dated November 14, 1893.

Application filed March 27, 1893. Serial No. 467,799. (No model.)

*To all whom it may concern:*

Be it known that I, BENJAMIN FRANKLIN MOSS, a citizen of the United States, residing at Reading, in the county of Hillsdale and State of Michigan, have invented certain new and useful Improvements in Crosscut-Saws, of which the following is a specification.

It is of great advantage in the use of cross-cut saws to have the hand of the operator as near the level of the point of operation or cutting edge as is possible. The saw blade must, however, in order to maintain its proper stiffness, be of considerable width throughout its cutting portion. Any other than the straight upright handle on cross-cut saws prevents the operator from allowing his hands to "swing" past him freely, and such handles are, therefore, the only ones commonly used. It is obvious, however, that from at or or near the termination of the cutting portion of the saw near each end the saw may diminish rapidly in width until it reaches the extreme ends, where the handles are attached, and thus the point of attachment of the handles may be considerably below the highest point on the back of the saw, and that such an arrangement will bring the hands of the operatives down to a point much lower than if the saw continued to its ends the full width, or even were the saw continued to the end on a level, as in the case of a straight backed saw. Besides this, the frictional resistance is reduced at the extreme ends in case they should be permitted to enter the cut, as sometimes happens in sawing very large logs, but in any case the stiffness of the saw is maintained, and the hand hold is permitted to be at the lowest practicable point relatively to the cutting edge or point of effective use.

A saw embodying my said invention will be first fully described and the novel construction thereof then pointed out in the claim.

Figure 1:
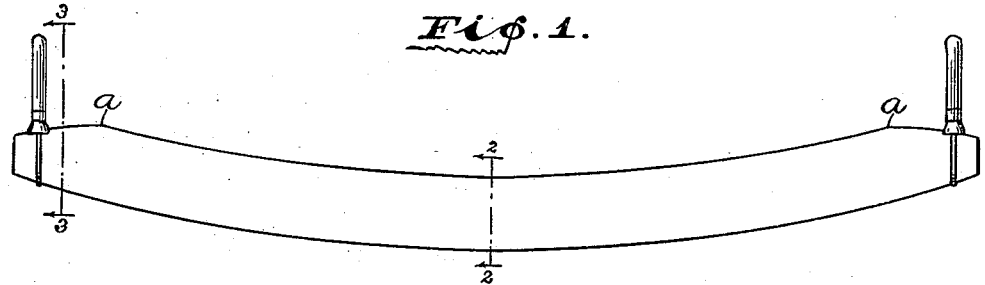
Figure 2:
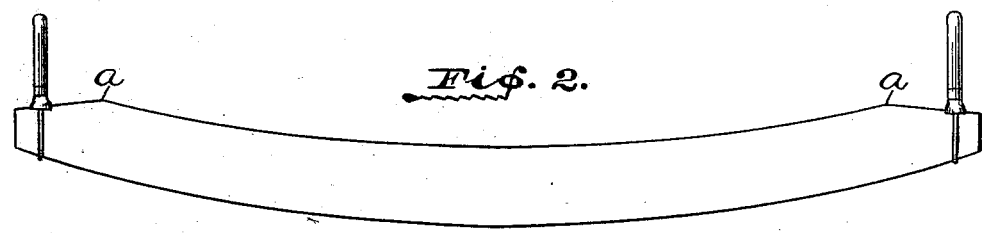
Figure 3:
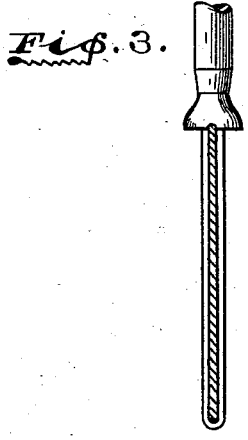
Figure 4:

Referring to the accompanying drawings, which are made a part hereof, and on which similar letters of reference indicate similar parts, Figure 1 is a side elevation of one form of cross cut saw embodying my said invention; Fig. 2 a similar view of a slightly modified form, and Figs. 3 and 4 transverse sectional views on the dotted lines 3 3 and 4 4 respectively.

As shown in the drawings, my improved saws are of that variety which have a curved cutting edge and a concave back, the back and edge being preferably, although not necessarily, parallel with each other, said saw being produced by cutting from the plate or sheet of steel a saw blade such as is shown in the drawings. The width determined by the curves continues to a point near the termination of the cutting edge of the saw, the curvature of the cutting edge continuing to the ends, while that of the back stops a short distance from each end at the points marked $a$. From these points to the extreme ends the cut on the back takes a different direction, narrowing the blade rapidly until it reaches the extreme end, where the handle is attached thereto. The full strength of the blade is thus continued throughout its cutting portion, and a stiff strong blade is thus secured, while the proper form or size of ends for the attachment of the handle is also secured, without impairing the strength of the saw, the distance from the handle to where the saw reaches its full width being so short as to be incapable of being bent under ordinary use, while the advantages of securing the handle of the saw to a point near its edge are still maintained.

The saw may, of course, be ground tapering in cross-section, as is usual in first class saws, and is so shown.

Having thus fully described my said invention, what I claim as new, and desire to secure by Letters Patent, is—

A saw formed with a convex cutting edge on the segment of a circle, and a concave back formed also on the segment of a circle, the curve of the back terminating at a point near each end, from which points the blade is diminished acutely, in relation to a straight line drawn through the two points which mark the termination of said curve in the back thus producing ends of less width at the points where the handles are attached than if the back were cut straight, substantially as shown and described.

In witness whereof I have hereunto set my hand and seal, at Reading, Michigan, this 21st day of March, A. D. 1893.

BENJAMIN FRANKLIN MOSS. [L. S.]

Witnesses:
A. M. R. FITZSIMMONS,
B. L. MALLERY.